United States Patent
Hyde et al.

(10) Patent No.: US 8,106,851 B2
(45) Date of Patent: Jan. 31, 2012

(54) VARIABLE METAMATERIAL APPARATUS

(75) Inventors: Roderick A. Hyde, Livermore, CA (US); Nathan P. Myhrvold, Medina, WA (US); Clarence T. Tegreene, Bellevue, WA (US); Lowell L. Wood, Jr., Livermore, CA (US)

(73) Assignee: The Invention Science Fund I, LLC

( * ) Notice: Subject to any disclaimer, the term of this patent is extended or adjusted under 35 U.S.C. 154(b) by 0 days.

(21) Appl. No.: 12/587,194

(22) Filed: Oct. 1, 2009

(65) Prior Publication Data

US 2010/0027102 A1 Feb. 4, 2010

Related U.S. Application Data

(62) Division of application No. 11/355,493, filed on Feb. 16, 2006.

(51) Int. Cl.
*H01Q 15/02* (2006.01)
(52) U.S. Cl. .................................................. 343/909
(58) Field of Classification Search .............. 343/909, 343/753, 754, 911 R, 904, 700 MS
See application file for complete search history.

(56) References Cited

U.S. PATENT DOCUMENTS

| | | | |
|---|---|---|---|
| 4,149,902 A | 4/1979 | Mauer et al. | |
| 4,254,330 A | 3/1981 | Stauffer et al. | |
| 4,804,848 A | 2/1989 | Horiba et al. | |
| 4,980,554 A | 12/1990 | Ahn | |
| 5,691,532 A | 11/1997 | Hait | |
| 5,777,326 A | 7/1998 | Rockwood et al. | |
| 6,180,415 B1 | 1/2001 | Schultz et al. | |
| 6,627,914 B1 | 9/2003 | Komiyama et al. | |
| 6,757,267 B1 * | 6/2004 | Evans et al. | 370/334 |
| 6,791,432 B2 | 9/2004 | Smith et al. | |
| 6,938,325 B2 | 9/2005 | Tanielian | |
| 6,958,729 B1 | 10/2005 | Metz | |
| 6,969,847 B2 | 11/2005 | Davis et al. | |
| 7,106,494 B2 * | 9/2006 | Osipov et al. | 359/299 |
| 7,145,124 B2 | 12/2006 | Garrood et al. | |
| 7,180,065 B2 | 2/2007 | Craig et al. | |
| 7,205,941 B2 * | 4/2007 | Wang et al. | 343/700 MS |
| 7,232,999 B1 | 6/2007 | Otten, III et al. | |
| 7,391,032 B1 | 6/2008 | Hyde et al. | |
| 7,405,866 B2 * | 7/2008 | Kuekes et al. | 359/321 |
| 7,522,124 B2 * | 4/2009 | Smith et al. | 343/909 |
| 2001/0038325 A1 | 11/2001 | Smith et al. | |
| 2003/0002045 A1 | 1/2003 | Nemat-Nasser et al. | |
| 2004/0066251 A1 | 4/2004 | Eleftheriades et al. | |
| 2004/0114203 A1 | 6/2004 | Batchko | |
| 2004/0184719 A1 | 9/2004 | Kiadeh | |
| 2004/0188617 A1 | 9/2004 | Devitt et al. | |
| 2004/0189528 A1 | 9/2004 | Killen et al. | |
| 2005/0070803 A1 | 3/2005 | Cullum et al. | |
| 2005/0073744 A1 | 4/2005 | Zheludev et al. | |
| 2005/0084268 A1 | 4/2005 | Weigert | |
| 2005/0098720 A1 | 5/2005 | Traynor et al. | |
| 2005/0107125 A1 | 5/2005 | Gilbert | |

(Continued)

OTHER PUBLICATIONS

U.S. Appl. No. 11/588,851, filed Oct. 26, 2006, Hyde et al.*

(Continued)

*Primary Examiner* — Jacob Y Choi
*Assistant Examiner* — Robert Karacsony (57) ABSTRACT

Artificial materials, such as metamaterials, include adjustable properties. In some approaches the properties are adjustable according to active feedback of interaction with electromagnetic waves.

13 Claims, 4 Drawing Sheets

U.S. PATENT DOCUMENTS

| | | |
|---|---|---|
| 2005/0134819 A1 | 6/2005 | de Jager |
| 2005/0146402 A1 | 7/2005 | Sarabandi et al. |
| 2005/0200540 A1* | 9/2005 | Isaacs et al. ............... 343/754 |
| 2005/0221128 A1 | 10/2005 | Kochergin |
| 2005/0247337 A1 | 11/2005 | Chen et al. |
| 2006/0022875 A1 | 2/2006 | Pidwerbetsky et al. |
| 2006/0049331 A1 | 3/2006 | Smith |
| 2006/0065833 A1 | 3/2006 | Craig et al. |
| 2007/0045541 A1 | 3/2007 | Urey et al. |
| 2008/0048126 A1 | 2/2008 | Janssen et al. |
| 2008/0165079 A1* | 7/2008 | Smith et al. ............... 343/911 R |
| 2008/0224031 A1 | 9/2008 | Gilchrist |
| 2008/0265150 A1 | 10/2008 | Holmes |

OTHER PUBLICATIONS

U.S. Appl. No. 12/218,226, filed Jul. 10, 2008, Hyde et al.*
U.S. Appl. No. 11/588,851, Hyde et al.
U.S. Appl. No. 12/218,226, Hyde et al.
Bergman, David J.; Stockman, Mark I.; "Surface Plasmon Amplification by Stimulated Emission of Radiation: Quantum Generation of Coherent Surface Plasmons in Nanosystems"; Physical Review Letters; bearing dates of Sep. 15, 2002; Jan. 14, 2003 and Jan. 17, 2003 and 2003; pp. 027402-1-027402-4; vol. 90, No. 2; The American Physical Society.
Caloz, Christophe; Itoh, Tatsuo; *Electromagnetic Metamaterials: Transmission Line Theory and Microwave Applications*; bearing a date of Nov. 2005; ISBN: 0-471-75431-5; Wiley-IEEE Press.
Eleftheriades, G. V.; Balmain, K. G; *Negative Refraction Metamaterials: Fundamental Principles and Applications*; bearing a date of Jul. 7, 2005; ISBN: 0-471-60146-2; Wiley-IEEE Press.
Fang, Nicholas; Zhang, Xiang; "Imaging properties of a metamaterial superlens"; Applied Physics Letters; bearing dates of Sep. 24, 2002; Nov. 18, 2002 and Jan. 13, 2003 and 2003; pp. 161-163; vol. 82, No. 2; American Institute of Physics.
Gay-Balmaz, Philippe; Martin, Olivier J.F.; Electromagnetic resonances in individual and coupled split-ring resonators; Journal of Applied Physics; bearing dates of Dec. 27, 2001, Jun. 10, 2002, Sep. 1, 2002 and 2002; pp. 2929-2936; vol. 92, No. 5; American Institute of Physics.
Greegor, R.B., Parazzoli, C.G., Nielsen, J.A., Thompson, M.A., Tanielian, M.H., and Smith, D.R.; "Simulation and testing of a graded negative index of refraction lens"; Applied Physics Letters; bearing dates of Jan. 26, 2005, Jul. 11, 2005, Aug. 25, 2005 and 2005; pp. 091114-1-091114-3; vol. 87, Issue 091114; American Institute of Physics; located at: http://ceta.mit.edu/adm/LHM_paper/papers/257.pdf; printed onDec. 19, 2005.
Li, Le-Wei; Yao, Hai-Ying; Wu, Qun; and Chen, Zhi-Ning; "Broad-Bandwidth and Low-Loss Metamaterials: Theory, Design and Realization;" Journal of Zhejiang University Science A; bearing dates of Sep. 5, 2005, Oct. 10, 2005, and 2006; printed on Feb. 15, 2006; pp. 5-23; vol. 7; Issue 1; located at http://www.edu.cn/jzus/2006/A0601/A060102.pdf.
PCT International Search Report; International App. No. PCT/US07/04400; Nov. 3, 2008; pp. 1-2.
PCT International Search Report; International App. No. PCT/US2006/048136; Nov. 7, 2008; pp. 1-2.
PCT International Search Report; International App. No. PCT/US07/04209, Nov. 26, 2008; pp. 1-2.
Pendry, J.B.; "Negative Refraction Makes a Perfect Lens"; Physical Review Letters; bearing dates of Apr. 25, 2000, Oct. 30, 2000 and 2000; pp. 3966-3969; vol. 85, No. 18; The American Physical Society.
Shelby, R.A.; Smith, D.R.; Schultz, S.; "Experimental Verification of a Negative Index of Refraction"; Science; bearing dates of Jan. 8, 2001, Feb. 22, 2001, and Apr. 6, 2001; pp. 77-79; vol. 292; located at: www.sciencemag.org.
Smith, D.R.; Mock, J.J.; Starr, A.F.; and Schurig, D.; "A Gradiant Index Metamaterial"; Physical Review E; bearing dates of Jul. 7, 2004 and Jul. 11, 2004; printed on Feb. 15, 2006; pp. 1-5; vol. 71; Issue 3; located at http://arxiv.org/ftp/physics/papers/0407/0407063.pdf.
Smith, D.R.; Padilla, Willie J.; Vier, D.C.; Nemat-Nasser, S.C.; Schultz, S.; "Composite Medium with Simultaneously Negative Permeability and Permittivity"; Physical Review Letters; bearing dates of Dec. 2, 1999, May 1, 2000 and 2000; pp. 4184-4187; vol. 84, No. 18; The American Physical Society.
Smith, D.R.; Pendry, J.B.; Wiltshire, M.C.K.; Review: Metamaterials and Negative Refractive Index; Science; bearing a date of Aug. 6, 2004; pp. 788-792; vol. 305; located at: www.sciencemag.org.
Smith, David R.; Rye, Patrick; Vier, David C.; Starr, Anthony F.; Mock, Jack J.; and Perram, Timothy; "Design and Measurement of Anisotropic Metamaterials that Exhibit Negative Refraction"; IEICE Trans. Electron; bearing dates of Sep. 3, 2003, Nov. 25, 2003, and Mar. 2004; pp. 359-370; vol. E87-C, No. 3.
Soukoulis, Costas M., ed.; Photonic Crystals and Light Localization in the 21st Century; Proceedings of the NATO Advanced Study Institute on Photonic Crystals and Light Localization; bearing a date of Jun. 18-30, 2000; ISBN: 0-792-36948-3; NATO Science Series: C: Mathematical & Physical Sciences; Kluwer Academic Publishers, Crete, Greece.
Xu,W.; Li, L.-W.; Yao, H.-Y.; Yeo, T.-S.; "Extraction of Constitutive Relation Tensor Parameters of SRR Structures Using Transmission Line Theory"; J. of Electromagn. Waves and Appl.; bearing a date of 2006; pp. 13-25; vol. 20, No. 01.
Jackson, John David; "Classical Electrodynamics"; Second Edition; bearing dates of 1962, 1975 and May 23, 2011; only cover page and pp. 343-344 provided; John Wiley & Sons, Inc.
Luo, Aiping et al.; "Evanescent-field coupling based on long period grating and tapered fiber"; Optics Communications, Science Direct; bearing a date of Jun. 8, 2004; pp. 69-73; vol. 240; Elsevier B.V.
Midwinter, J.E.; "Evanescent Field Coupling into a Thin-Film Waveguide"; IEEE Journal of Quantum Electronics; bearing dates of Feb. 16, 1970 and Oct. 1970; pp. 583-590; vol. QE-6, No. 10.
S.J. Pedrotti, Frank L. et al.; "Introduction to Optics"; Second Edition; bearing dates of 1987, 1993 and May 23, 2011; only cover page and pp. 419-420 provided; Prentice-Hall, Inc.
"Total internal reflection fluorescence microscope"; Wikipedia; bearing a date of May 16, 2011; pp. 1-3.
Watts, R.K.; "Evanescent field coupling of thin-film laser and passive waveguide"; J. Appl. Physc., bearing dates of Jul. 23, 1973 and Dec. 1973; pp. 5635-5636; vol. 44, No. 12; American Institute of Physics.

* cited by examiner

FIG.8

VARIABLE METAMATERIAL APPARATUS

This application constitutes a divisional of U.S. application Ser. No. 11/355,493, titled VARIABLE METAMATERIAL APPARATUS filed on Feb. 16, 2006.

BACKGROUND

The present application relates to artificial materials, such as metamaterials and similar structures.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Metamaterials have recently been described in a variety of applications across a range of frequencies. Generally speaking, metamaterials are materials that acquire their electromagnetic properties from their structures, rather than their material makeup.

One example of an application of metamaterials was presented by Pendry, et al. in *Negative Refraction Makes a Perfect Lens*, Pendry, et. al., Phys. Rev. Lett. 85, 3966-3969 (2000), and demonstrated in metamaterials in *Metamaterials and negative refractive index*, D. R. Smith, J. B. Pendry, M. C. K. Wiltshire, Science, 305, 788 (2004) and in *Design and measurement of anisotropic metamaterials that exhibit negative refraction*, D. R. Smith, P. Rye, D. C. Vier, A. F. Starr, J. J. Mock, T. Perram, IEICE Trans. Electron., E87-C, 359 (2004), each of which is incorporated by reference. In one example, the metamaterials are formed from arrays of split ring oscillators, although a number of other metamaterials and negative refractive materials have since been described. Such materials can be designed to define selected permittivities and permeabilities, depending upon the material properties, shapes, configurations, and couplings. For example, metamaterials have been fabricated to define left-handed materials, as described in *Left-handed metamaterials*, D. R. Smith, W. J. Padilla, D. C. Vier, R. Shelby, S. C. Nemat-Nasser, N. Kroll and S. Schultz, Photonic Crystals and Light Localization, ed. C. M. Soukoulis (Kluwer, Netherlands, 2000) or to have negative refraction, as described in the previously incorporated Pendry and Smith references, as well as a number of patents and published patent applications, including the United States patent application number 20040066251 to Eleftheriades, entitled Planar metamaterials for control of electromagnetic wave guidance and radiation and U.S. Pat. No. 6,938,325 of Tanielian, entitled Methods of Fabricating Electromagnetic Metamaterials, each of which is incorporated herein by reference. Moreover, the permittivity and permeability can both be defined to be negative, as described in D. R. Smith, W. Padilla, D. C. Vier, S. C. Nemat-Nasser, and S. Schultz, "*Composite Medium with Simultaneous Negative Permittivity and Permeability*," Phys. Rev. Lett., 84, 4184-4187 (2000), which is incorporated herein by reference.

Many of the structures and systems incorporating metamaterials employ discrete components, such as split ring oscillators, transmission lines, Swiss rolls, or similar structures that may be formed using conventional approaches, such as hand fabrication, photolithography, machine assembly or similar processes. More detailed analysis and a range of illustrative metamaterial structures can be found in Christophe Caloz, Tatsuo Itoh, Electromagnetic Metamaterials: Transmission Line Theory and Microwave Applications; ISBN: 0-471-66985-7; November 2005, Wiley-IEEE Press and in G. V. Eleftheriades, K. G Balmain, *Negative-Refraction Metamaterials: Fundamental Principles and Applications*, ISBN: 0-471-74474-3; August 2005, each of which is incorporated herein by reference.

One often cited aspect of metamaterials is loss, due to finite Q of the various elements in the metamaterial. Often the finite Q results from resistive losses of the physical structures or losses due to plasmon propagation along interfaces between conductors and dielectrics. More detailed discussion of loss and bandwidth of metamaterials can be found for example, in "Broad-bandwidth and low-loss metamaterials: Theory, design and realization," Li et al., J Zhejiang Univ SCIENCE A 2006 7(1):5-23, found at http://www.zju.edu.cn/jzus/2006/A0601/A060102.pdf which is incorporated herein by reference.

In many applications of metamaterials, the design is impacted by apparent loss in the materials that form the metamaterials. Often, the loss comes from resistance of the material, or decay of plasmons propagating at a metal-dielectric interface. Such loss may be modeled as a resistor in an equivalent circuit of an element of the metamaterial, as illustrated by Wu, et. al, EXTRACTION OF CONSTITUTIVE RELATION TENSOR PARAMETERS OF SRR STRUCTURES USING TRANSMISSION LINE THEORY, J. of Electromagnetic Waves and Appl., Vol. 20, No. 01, 13-25, 2006 which is incorporated herein by reference.

Figure 1:
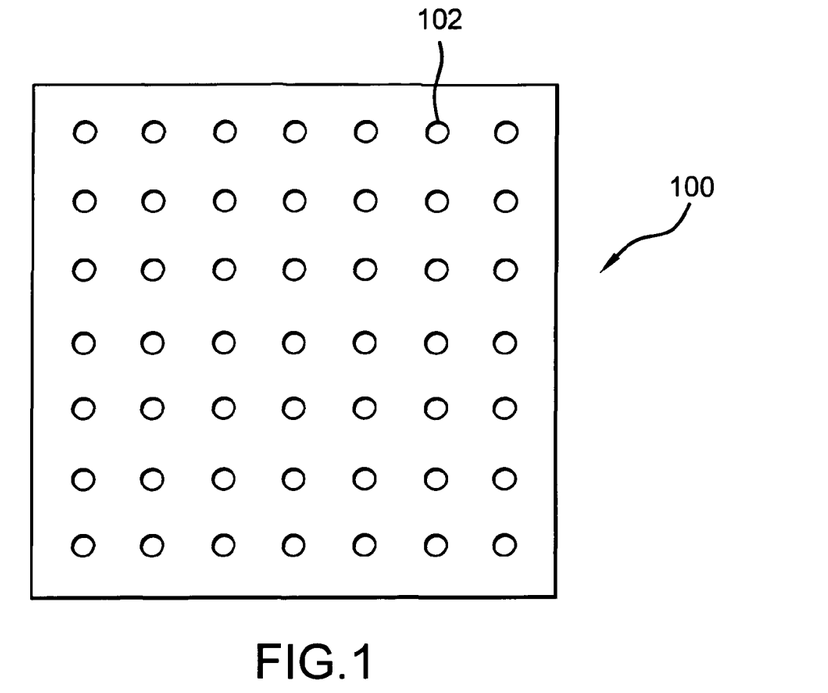
FIG. 1 is a top plan, diagrammatic view of an arrangement of elements.

As shown in FIG. 1, the metamaterial structure 100 is formed from an array of elements 102 arranged in a rectilinear array. While the metamaterial structure 100 is presented as a rectilinear array, other patterns of elements 102 may be implemented according to design considerations. Moreover, the elements 102 are not necessarily identical in structure or response. For example, a gradient index metamaterial was described in Smith, et. al, *Gradient Index Metamaterial*, Physical Review E, vol. 71, Issue 3, id. 036609, http://arxiv.org/ftp/physics/papers/0407/0407063.pdf which is incorporated herein by reference. Additionally, FIG. 1 presents a top plan view, and the discussion herein generally concentrates on two dimensional patterns for clarity of presentation, however, three-dimensional structures may also be implemented. Further, although the actual physical materials forming the elements and/or the remainder of the structure may have an effective permittivity or permeability that is substantially unity at a given frequency, the overall response, or group response, of a metamaterial can differ greatly from unity at the given frequency and can even be negative as described further herein. In some embodiments, materials forming the metamaterial may have a non-unity permittivity or permeability at lower frequencies may have permittivities or permeabilities at high frequencies, such as optical frequencies that become substantially unity. However, the metamaterial structure, as described with respect to the illustrative embodiments of arrangements of elements 112 herein, can produce permittivity is and permeabilities at our nonunity. And, as described further herein, the effective dielectric constant, or the real portion of the dielectric constant, of the metamaterial may also be nonunity. Generally speaking a wide range of wave shaping effects can be implemented by such metamaterials, including focusing.

Figure 2:
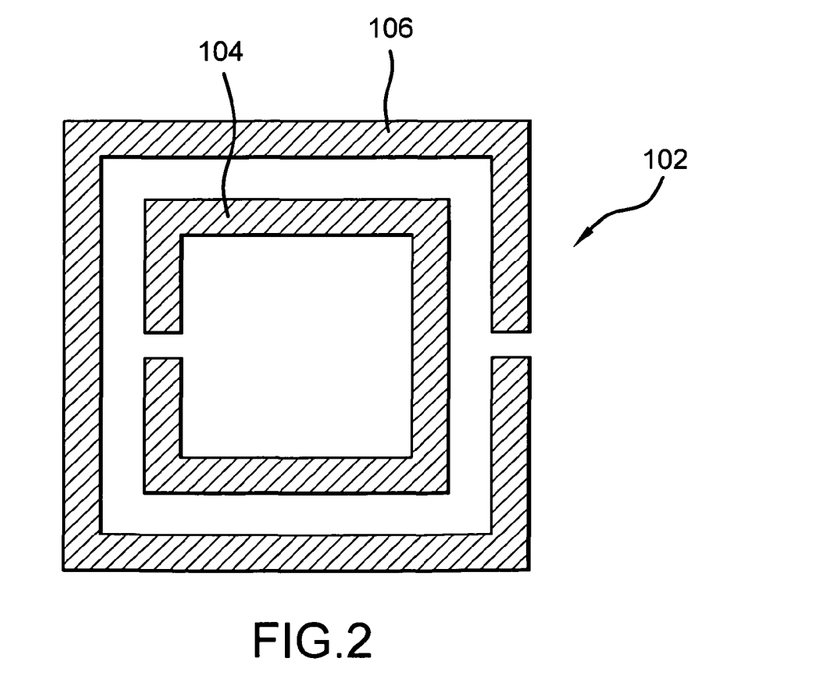
FIG. 2 is a diagrammatic representation of a split ring resonator.

FIG. 2 shows an illustrative element 102 formed by a pair of split rings 102, 104. The general resonant response of split ring resonators, and the effective permeability and permittivity of arrays of split ring resonators has been described analytically and experimentally in several of the papers incorporated herein by reference and in Philippe Gay-Balmaz and Olivier J. F. Martin, *Electromagnetic resonances in individual and coupled split-ring resonators*, J. Appl. Phys., Vol. 92, No. 5, (September 2002).

Figure 3:
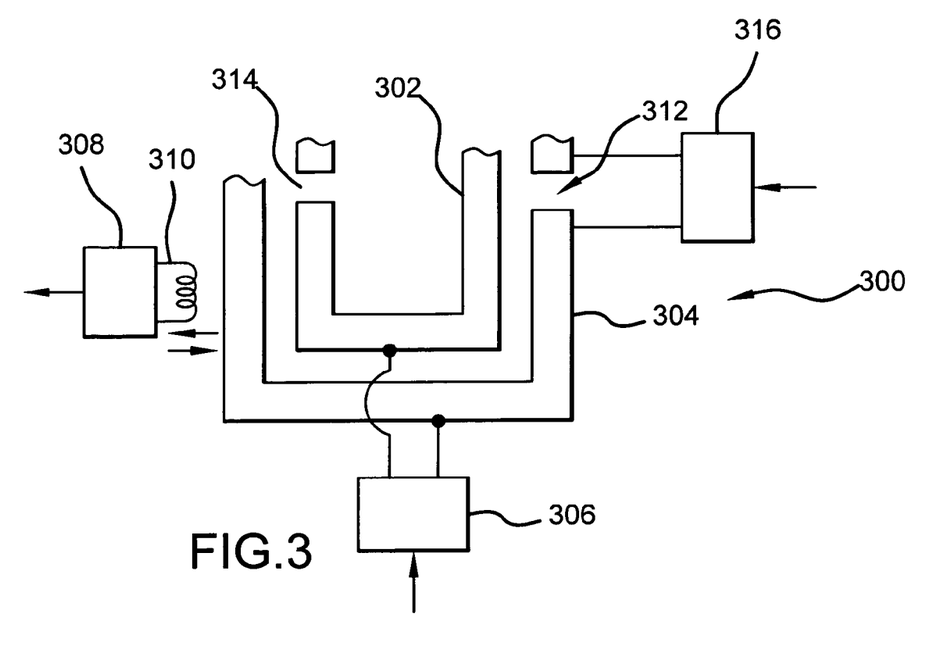
FIG. 3 is a diagrammatic representation of a portion a split ring resonator with related circuitry.

As shown in FIG. 3, and actively controlled element 300 includes a pair of split rings 302, 304 positioned to interact with each other to form a resonant structure. Additionally, a first active circuit 306 is coupled to both of the split rings 302, 304. In one approach, the first active circuit 306 includes sensing circuitry that detects electromagnetic differences between the interior split ring 302 in the exterior split ring 304. In one approach, the electromagnetic differences may include relative amplitude and/or phase of electric potentials at one or more locations on each of the split rings 302, 304. As shown in FIG. 3, the first active circuit 306 is coupled at single locations on each of the split rings 302, 304. However, the first active circuit 306 may be coupled at more than one location on each of the split rings 302, 304. Moreover, coupling may be a direct electrical connection, a capacitive coupling, or a more indirect measure of electrical or magnetic state. For example, an optical measurement system may detect changes in optical response of a material positioned nearby or supporting one or more of the split rings 302, 304. In such an implementation, for example, the supporting material may be an electro-optic material such as LiNbO3 whose index of refraction may vary according to electric fields.

Figure 4:
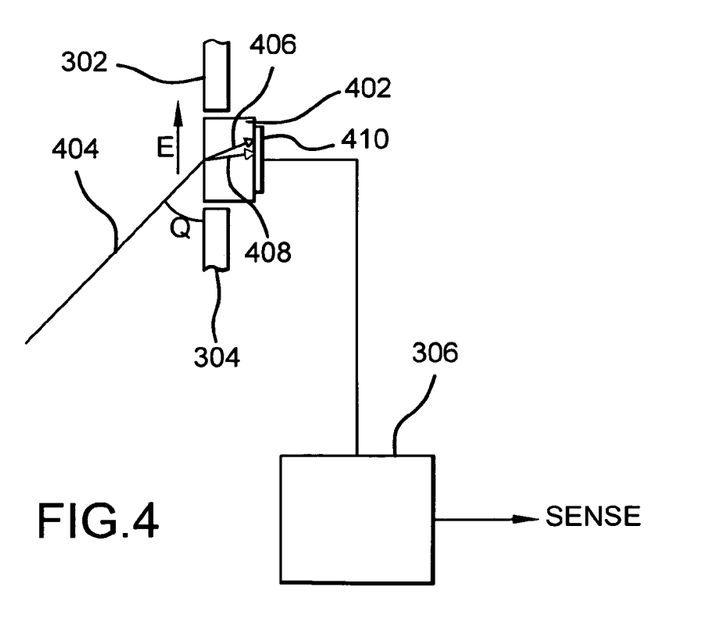
FIG. 4 is a diagrammatic representation showing optical detection of fields in an element.

In one such implementation shown in FIG. 4, an electro-optic material 402 is positioned intermediate the interior split ring 302 and the exterior split ring 304. An optical beam 404 strikes the electro-optic material 402 and a first angle θ and bends toward the normal as represented by a first ray 406. The amount of the bending is determined by the vector electric field between the interior split ring 302 and the exterior split ring 304, as represented by the arrow E. As the electric field E changes, the amount of bending of the optical beam changes, as represented by a second ray 408. The amount of change of the angle θ and whether the angle θ increases or decreases will depend upon the electro-optic tensor of the electro-optic material.

An optical detector 410 receives the deflected optical beam and provides an electrical signal indicative of the amount of deflection to the first active circuit 306. The optical detector may be implemented in a variety of fashions. For example, an array of photodetectors can provide respective signals indicating the amount of light energy striking each of the photodetectors. In another approach, a photo resistor can provide an indication of the location at which the light beam strikes of a resistor. In still another approach, a photo detector aligned to an aperture will receive an amount of energy corresponding to how well aligned the optical beam is to the aperture. Since the degree of alignment will depend upon the angle of deflection of the optical beam 404, the photo detector will provide a signal corresponding to the amount deflection.

Returning to discussion of FIG. 3, in addition to detecting the electromagnetic differences between the interior split ring 302 and the exterior split ring 304, the first active circuit 306 may also actively correct for deviations between the actual detected electromagnetic differences and a target value corresponding to a selected response of the element 102. In one approach, where the phase of the detected signal differs from the target value, the first active circuit 306 may provide a signal SENSE corresponding to a phase correction.

Figure 5:
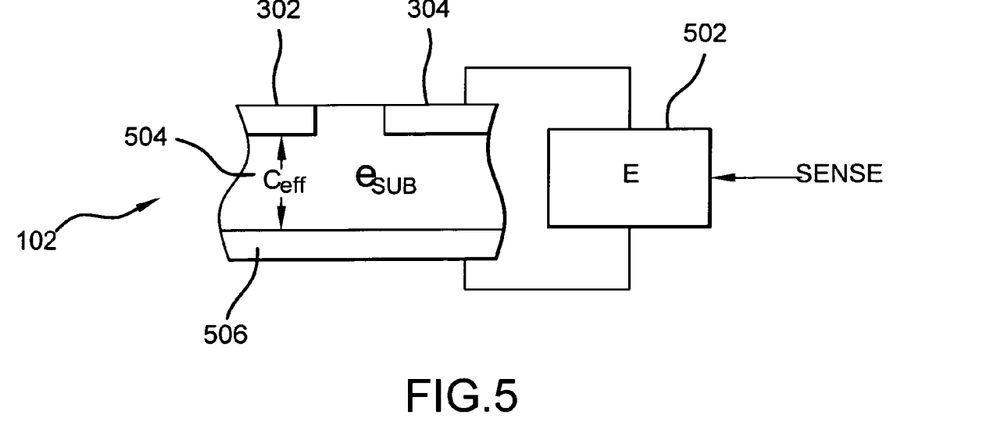
FIG. 5 is a diagrammatic representation showing electrical detection of fields in an element.

As shown in FIG. 5, a correction circuit 502 receives the signal SENSE and changes the physical or electromagnetic properties of the element 102. As represented in FIG. 5, the correction circuit may apply an electrical signal that changes an effective dielectric constant $\in$ of a material 504 positioned between the split rings 302, 304 and a reference electrode 506. The changed dielectric constant $\in$ of the material 504 produces a difference in an effective capacitance C and thus a change in the electromagnetic response of the element 102, thereby changing the relative phase.

While this illustrative example relates to changing an effective capacitance C, a more complete implementation could compensate for shifts in the resonant frequency of the element 102. For example, changing the physical dimensions of the element 102 or inducing a variation in an inductive component can produce a compensating change in the frequency response to maintain or shift the resonant frequency to establish the resonant frequency relative to a target frequency. A variety of the equivalent circuit models and/or resonant structure models have been described in the literature. Such approaches may be used to determine the changes an effective capacitance, dimensions, inductance, or other parameters to establish the selected relative phase and frequency response. Moreover, as described previously for sensing, the correction circuit 502 may change the capacitance, dimensions, inductance, or other parameters at more than one location or may do so in a distributed fashion. Also, while the correction circuit 502 is presented as a structure separate from the first active circuit 306, the correction circuit 502 may be a component of and/or integral to the first active circuit 306.

Further, while the approach described with respect to FIG. 5 implements changes in such parameters through an applied electric field between electrodes, a variety of other approaches may be applied to produce such change parameters. For example, application of compressive force can produce changes in effective dielectric constants in piezoelectric materials. Similarly, moving ferromagnetic or ferroelectric materials to differing positions relative to the split rings 302, 304 or relative to other nearby portions of the element 102 can produce corresponding changes in such parameters. In still another approach, mechanical force, electric fields, magnetic fields, or other stimuli can produce physical deformation of components within the elements, thereby changing their parameters. For example, physically deforming a dielectric positioned between two plates can change the effective capacitance, thereby changing the effective parameters. In another example, acoustic signals or other mechanical waves can produce the physical deformation.

The previously described approaches relate primarily to DC types of adjustments or slow rate adjustments. However, in some applications it may be desirable to adjust much more rapidly or in an AC fashion. In still another approach, nonlinear effects can produce variations in the response of the elements 102. One type of nonlinear effect that may be implemented involves applying to the elements 102 more than one wave. In a wave mixing approach, a plurality of waves arriving at one of the elements 102 can produce harmonic frequencies or beat frequencies that are a combination of the arriving waves. Further, one or both of the waves may produce an effective change in the elements 102. For example, if an element 102 includes a nonlinear optical material, one of the waves can produce a variation in the dielectric constant of the nonlinear optical material that, in turn, changes the effective parameters of the element 102. Thus, one, or both, of the waves can produce effective parameter changes that in turn, change the response of the element 102 to the other wave. If the wave that produces the change is substantially uniform across a set of elements 102, the changes in the elements may be substantially uniform. However, where it is determined that a variation in the amount of change of the elements is appropriate, the wave that produces the change may be nonuniform. The nonuniformity or uniformity may be developed according to empirical methods, feedback methods or other methods, such as those described with respect to FIG. 8.

Figure 6:
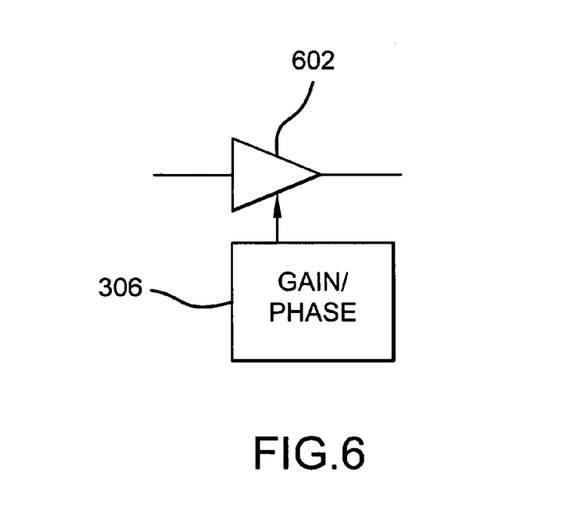
FIG. 6 is a representation of gain circuitry in an element.

In addition to controlling the relative phases and frequencies of signals carried by or in the split rings 302, 304, or changing the effective parameters of the split rings 302, 304, the first active circuit 306 may also adjust the amplitude of currents or relative voltages in one or both of the split rings 302, 304. As represented diagrammatically in FIG. 6, and in-line amplifier 602 may increase the amplitude of signals carried by one or more of the split rings 302, 304. One skilled in the art will recognize that the representation of FIG. 6 is diagrammatic and that the amplification of the signal may be implemented in a variety of fashions, including integrating active components into or onto one or more of the split rings 302, 304. A variety of structures for amplifying signals carried by or in conductors have been described. For example, in at microwave frequencies, a variety of monolithic microwave integrated circuits (MMICs) are available. Moreover, phase and amplitude may be controlled by separate devices or by an integrated device, such as a variable phase amplifier.

In addition to, or instead of, detecting electric fields between the split rings 302, 304, a second active circuit 308 may detect movement of charges or in or on changes in charge distribution in one or both of the split rings 302, 304. As represented in FIG. 3, the second active circuit 308 includes a coupled sensor 310, represented as an inductor, positioned adjacent the outer split ring 304.

The second active circuit 308 can detect movement of charges within the outer split ring 304 and produce a signal indicative of the amplitude and phase of signals carried on or in the outer split ring 304.

Figure 7:
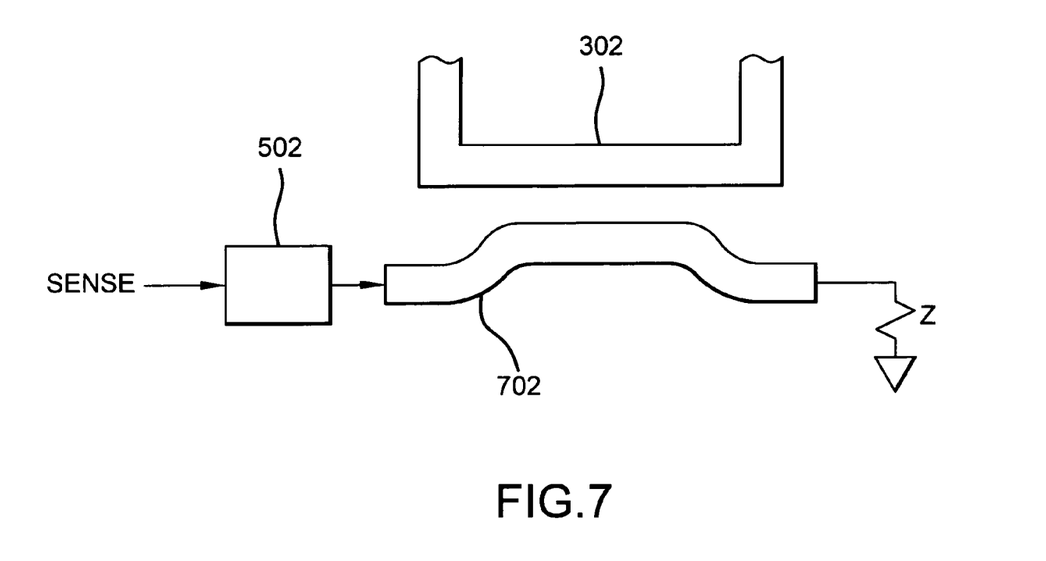
FIG. 7 is a diagrammatic representation of a portion of an evanescently coupled guide.

In some applications, the amplitude of the signal carried by one or more of the split rings 302, 304 may be increased by evanescently coupling energy into the respective split rings 302 or 304, as presented diagrammatically in FIG. 7, for the split ring 302. In this approach, the correction circuit 502 provides a signal to an evanescently coupled waveguide 702 that is positions near to the split ring 302. Energy carried by the waveguide 702 couples evanescently into the split ring 302. Where the evanescently coupled energy is of a frequency and phase that increases the amplitude of a signal in the split ring 302, the energy carried by the split ring 302 is effectively amplified.

While the diagrammatic representation of the evanescently coupled waveguide 702 of FIG. 7 shows the evanescently coupled waveguide 702 positioned beside a segment of the split ring 302, and some applications, the evanescently coupled waveguide 702 may be positioned beneath the segment of the split ring 302, depending upon other design considerations, such as fabrication or relative positioning of the exterior split ring 304. Moreover, although the evanescently coupled waveguide 702 is shown as being terminated by a resistance Z, such termination may not be necessary, for example, where the evanescently coupled waveguide 702 is a lossy waveguide or is an optical waveguide.

As an alternative to or in addition to evanescent coupling, inductive coupling can also provide amplitude and/or phase control of signals carried in one or more of the split rings 302, 304. In one approach, the second active circuit 308 of FIG. 3 can provide additional signal strength within the split ring 304. In this approach, the second active circuit 308, responsive to a control signal, produces current in the coupled sensor 310, which in this arrangement acts as a field generator, in addition to, or instead of, acting as a sensor. The coupling of signals between a magnetic field generator and a conductor such as the split ring 304 produces current in the conductor according to conventional electromagnetic carried.

In addition to, or instead of, the evanescent, inductive, and inter-ring electric field approaches described previously, another approach addresses signals at one or both of the gaps 312, 314 in the split rings 302, 304. In this approach, a third active circuit 316 is coupled across the gap 312. The third active circuit 316 can detect electric fields across the gap 312 and/or can provide signals to the split ring 304 by producing electric potential's across the gap 312. The third active circuit 316 can be directly coupled to the split ring 304, as represented diagrammatically in FIG. 3, or can be coupled in any other known fashion, including by monitoring electric fields in the gap 312 as described with respect to FIG. 4.

While the discussion of the element 102 has concentrated primarily upon measuring, adjusting, or otherwise adapting effects at individual elements, the approaches described herein will typically be applied to more than one of the elements 102 in the metamaterial structure 100. In some applications, the response of individual ones of the elements 102 may be modified in selected sets. For example, in one approach, alternate elements (e.g., even or odd elements) may be adjusted to shift their center responses to a frequency different from that of an expected incoming wave. In some approaches, shifting the resonant frequency can change the effective parameters, by reducing interaction of individual elements with energy at a given frequency. Similarly, shifting the resonant frequency of individual elements relative to other individual elements can reduce inter-element coupling, thereby changing the overall response of the arrangement of elements 102. In a similar approach to removing or reducing interaction of selective elements, the orientation of the elements 102 may be varied. For example, rotating a split ring resonator from a first position to an orthogonal position relative to the incoming wave can effectively remove the element, or a portion of the element, from the arrangement of elements 102. Such an approach may be established through physical manipulation or by mounting all or a portion of the element 102 one a rotatable support structure, such as a MEMS device or similar structure. In still another approach, an intervening material or nearby material can affect coupling between elements 102. For example, a material having non-unity permeability can increase field coupling between elements 102. This effect can produce changes in inter-element coupling band the material with a non-unity permeability is moved relative to one or more of the elements 102.

Where center frequencies are sufficiently shifted, the altered elements have substantially no effect on the incoming wave and are thus effectively removed from the overall arrangement of elements 102. Accordingly, selectively removing or replacing elements in the arrangement of elements 102 allows the arrangement of elements 102 to be established with a degree of arbitrariness. Further, where some elements are altered, rather than removed from the arrangement of elements 102, and others are selectively removed or replaced, the degree of flexibility in establishing the arrangement of elements 102 is increased. An additional degree of freedom can be added by providing physical mobility of sets of the elements 102 relative to other elements 102. This may be provided by mechanical structures, electroactive structures, or by mounting all or a portion of some of the elements one respective MEMS devices.

In some more sophisticated approaches, the response of individual elements may be adjusted slightly to provide increased uniformity of response across a set of elements or to produce adjusted patterns of effective refractive index. For example, an increasing percentage of the elements may be effectively removed from the pattern as a function of radial distance from a central point. Alternatively, the responsiveness of selected ones of the elements may be reduced according to radial distance from the central point. Other adjustments may also be implemented. For example, the effect of elements may be varied according to a variety of design approaches or considerations. In one illustrative example, regions of elements may be effectively removed to produce localized variations in effective index of refraction. Such approaches may produce diffractive distributions, gradient distributions, periodic distributions, asymmetric distributions, or a variety of other distributions.

As noted previously, inter-element coupling can affect the overall response of the arrangement of elements 102. Some arrangements may rely upon passive coupling between respective elements, such as coupling through fields that arise through operation of the elements 102. In such arrangements, the individual resonators will typically tend to interact relatively weakly, yet, such we coupling can have significant effects on the overall response.

In another approach, active structures can help improve or control inter-element coupling. In one approach, signals corresponding to the parameters detected by the first, second, or third active circuits 306, 308, 316 can be carried by conductors or waveguides between respective ones or groups of the elements 102. In such an approach, the carried signals may be produced by electrical circuitry within the first, second, or third active circuits 306, 308, or 316. Alternatively, the carried signals may be produced directly responsive to signals within the elements 102. In one such arrangement, fields within a split ring resonator trio to, 316 can be evanescently coupled to a waveguide that extends between a first of the elements 102 and a second of the elements 102. The amplitude and phase of signals in the waveguide will then correspond to the amplitude and phase in the first element. As the waveguide nears the second of the elements 102, energy from the signal in the waveguide couples evanescently to the second element 102. At some frequencies, coupled energy may be a guided microwave mode. At higher frequencies, the coupled energy may be guided in the form of plasmons. Guiding and propagation of plasmons, as well as concentration, loss, and re-direction, has developed broadly and allows inter-element coupling at optical frequencies. Moreover, as various plasmonic elements are developed, inter-element coupling using plasmons is not limited to passive coupling or transmission. For example, surface plasmon amplification has been suggested by Bergman, et al., in *Surface Plasmon Amplification by Stimulated Emission of Radiation: Quantum Generation of Coherent Surface Plasmons in Nanosystems*, Phys. Rev. Lett. 90, 027402 (2003) which is incorporated herein by reference. Similarly, plasmonic guides and devices have been described generally.

Each of the above patterns may be established according to fixed design parameters, may be adjusted or established through active approaches, or may be a hybrid combination. In a fixed design approach, a pattern of effective refractive index is selected. The selection may be according to set of data provided by another source, such as a third-party or a computer or analytical model. Thus, the various approaches to adjusting the arrangement of elements 102, including removal of elements, changing of the parameters of individual elements, relative motion of elements, or other approaches to adjusting the arrangement of elements can be based upon data sets. Where more than one data set are stored in a memory, the response of arrangement of elements 102 can be controlled according to the retrieved set of data.

In one aspect, the model may include effective permittivity and/or permeability. Moreover, and some approaches, the real and imaginary components of the effective permittivity and/or permeability may be considered. In a particular instance, the response of individual elements may be varied to produce an effective dielectric constant with a negative real component. Further, varying the response of individual elements can convert the effective dielectric constant from one with a negative real part to one with a positive real part, or vice versa.

Figure 8:
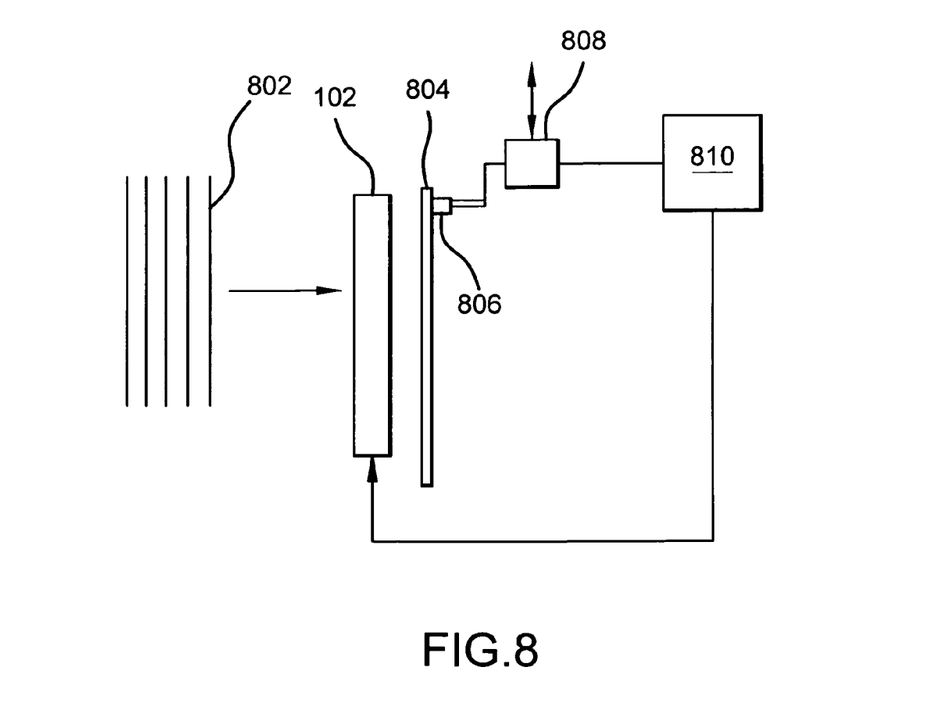
FIG. 8 is a diagrammatic representation of detection and control of an arrangement of elements.

In an interactive approach represented diagrammatically in FIG. 8, the set of elements 102 may be arranged according to an initial pattern with an initial set of individual responses of the elements. An input signal, such as a known plane wave 802, can then be applied to the initial arrangement of elements 102 and a corresponding output can be measured, for example, at an image field 804.

In one approach, a field probe 806 moves through the image field 804 and measures field strength at a series of locations. The field probe 806 provides electrical signals to measurement circuitry 808. As the field probe 806 moves through the image field, the measurement circuitry 808 can build a representation of the field strength in the image field. In some approaches, the field probe 806 may also detect relative phases to provide a more complete representation of the field strength.

From the representation of the field strength, a processor 810 can determine an overall or group response of the elements 102 to the plane wave 802. Once the group response of the arrangement of elements 102 has been measured, the response of one or more of the elements can then be adjusted. Typically, such adjustment begins with a comparison of the actual response with a predicted response. Then, based on an analytical, digital or similar model or based upon an iterative procedure, or both, the responses of individual elements will be adjusted to bring the actual response closer to the predicted response.

In an illustrative process, the processor 810 can compares the determined overall response of the elements 102 to an expected overall response of the elements 102 to determine differences between them. Using the determined differences, the processor 810 can provide control signals to adjust the response of the individual elements, according to the approaches described herein above, or similar approaches. The processor 810 is typically implemented and a microprocessor based configuration, although other types of image processing circuitry or other electrical circuitry may be added to or substituted for a microprocessor based configuration. Moreover, the representation of the field strength may be determined using electromechanical systems or image processing circuitry, or combination thereof. In some applications, adjustment of the elements may use classic feedback techniques or more complex techniques based upon processing of the determined representation of the overall response of elements 102. Moreover, while the representative structure described herein includes feedback, feed forward techniques may by used instead or in addition to feedback techniques.

As represented in FIG. 8, the image field 804 is positioned nearby the arrangement of elements 102. In some applications the image field may be within the effective near field of the arrangement of elements 102. Such an arrangement may be useful in a variety of applications, including determining response of a super lens such as is described in Fang, et al., *Imaging Properties of a Metamaterial Superlens*, Applied Phys. Letters, Vol. 82, No. 2, (Jan. 13, 2003), which is incorporated herein by reference. Alternatively, or in addition to near field measurements, the field probe 806 may measure field strengths and/or phases at other locations, including in a far field region. Moreover, measurements in the far field may be simplified to evaluating overall or group response of the arrangement of elements 102, such as spot size of a focusing lens, refraction effects, scattering, or similar properties.

Those having skill in the art will recognize that, for many systems, the state of the art has progressed to the point where there is little distinction left between hardware and software implementations of certain aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

While the illustrative embodiments described herein have primarily related to metamaterials operable at RF frequencies, metamaterials can be constructed at higher frequencies, including optical frequencies. With respect to such constructions, the scale of elements 102 is typically significantly smaller and the split ring resonators 302, 304 described herein. At such dimensions, the physical structures may be implemented with significantly different shapes, such as nanopillars, crystalline structures, transmission lines or their equivalents, or a variety of other types of structures.

The foregoing detailed description has set forth various embodiments of the devices and/or processes via the use of block diagrams, diagrammatic representations, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various embodiments described herein can be implemented, individually and/or collectively, by various types of electromechanical systems having a wide range of electrical components such as hardware, software, firmware, or virtually any combination thereof; and a wide range of components that may impart mechanical force or motion such as rigid bodies, spring or torsional bodies, hydraulics, and electro-magnetically actuated devices, piezoelectric, electroactive, or virtually any combination thereof. Consequently, as used herein "electromechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those skilled in the art will recognize that it is common within the art to describe devices and/or processes in the fashion set forth herein, and thereafter use engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An adjustable artificial medium, comprising:
    an arrangement of electromagnetically responsive structures, arranged in a pattern that produces a non-unity effective permittivity and/or permeability at a characteristic frequency, each of the electromagnetically responsive structures having electromagnetic properties that are variable responsive to respective control signals; and
    control circuitry coupled to each of the electromagnetically responsive structures and operable to produce the control signals,
    wherein the coupling between the control circuitry and the respective electromagnetically responsive structures is an evanescent field coupling.

2. The adjustable artificial medium of claim 1, wherein the characteristic frequency corresponds to one or more infrared wavelengths.

3. The adjustable artificial medium of claim 1, wherein the control circuitry includes a processor.

4. The adjustable artificial medium of claim 1, wherein the control circuitry further includes comparing circuitry responsive to an indication of a response of the artificial medium to provide the control signals.

5. An adjustable artificial medium, comprising:
    an arrangement of electromagnetically responsive structures, arranged in a pattern that produces a non-unity effective permittivity and/or permeability at a characteristic frequency, each of the electromagnetically responsive structures having electromagnetic properties that are variable responsive to respective control signals;
    control circuitry coupled to each of the electromagnetically responsive structures and operable to produce the control signals; and
    respective detectors coupled to each of the electromagnetically responsive structures, each of the detectors being coupled to the control circuitry,
    wherein each of the respective detectors includes an electro-optic medium positioned for electromagnetic field coupling to the electromagnetically responsive structures and wherein the electro-optic medium is an medium whose optical properties vary in response to applied electrical fields.

6. The adjustable artificial medium of claim 5 wherein each of the respective detectors includes one or more components positioned to detect an electric field potential corresponding to the electromagnetic properties of the electromagnetically responsive structures.

7. The adjustable artificial medium of claim 5, wherein the respective electromagnetically responsive structures include signal amplifiers.

8. The adjustable artificial medium of claim 7, wherein the signal amplifiers include MMICs.

9. The adjustable artificial medium of claim 7, wherein the respective electromagnetically responsive structures include optical amplifiers.

10. The adjustable artificial medium of claim 5, wherein the respective electromagnetically responsive structures are physically deformable in a manner that changes their electromagnetic properties.

11. The adjustable artificial medium of claim 5, wherein the respective electromagnetically responsive structures are physically deformable in response to an electromagnetic field.

12. The adjustable artificial medium of claim 5, wherein the respective electromagnetically responsive structures include piezoelectric materials.

13. The adjustable artificial medium of claim 5, wherein the respective electromagnetically responsive structures include MEMS components.

* * * * *

UNITED STATES PATENT AND TRADEMARK OFFICE
CERTIFICATE OF CORRECTION

| | | |
|---|---|---|
| PATENT NO. | : 8,106,851 B2 | Page 1 of 1 |
| APPLICATION NO. | : 12/587194 | |
| DATED | : January 31, 2012 | |
| INVENTOR(S) | : Roderick A. Hyde et al. | |

It is certified that error appears in the above-identified patent and that said Letters Patent is hereby corrected as shown below:

Column 12, line 28, Claim 5 "electro-optic medium is an" should read --electro-optic medium is a--

Signed and Sealed this
Nineteenth Day of June, 2012

David J. Kappos
*Director of the United States Patent and Trademark Office*